United States Patent

Murphy et al.

[11] 3,722,859
[45] Mar. 27, 1973

[54] BALL VALVE SEAL FOR HIGH TEMPERATURE OPERATION

[75] Inventors: Francis E. Murphy, Greensburg; William L. Kane, Trafford, both of Pa.

[73] Assignee: Walworth Company, Bala Cynwyd, Pa.

[22] Filed: Mar. 22, 1971

[21] Appl. No.: 126,848

[52] U.S. Cl. ................................................251/315
[51] Int. Cl. .................................................F16k 5/06
[58] Field of Search.......251/315, 316, 175, 359, 360

[56] References Cited

UNITED STATES PATENTS

| | | | |
|---|---|---|---|
| 3,211,421 | 10/1965 | Johnson, Jr. et al.................251/315 |
| 3,497,176 | 2/1970 | Priese..............................251/315 X |
| 3,131,906 | 5/1964 | King................................251/315 X |
| 3,416,558 | 12/1968 | Works..............................251/315 X |
| 3,439,897 | 4/1969 | Priese et al. .....................251/315 X |
| 3,460,802 | 8/1969 | Colby et al. .....................251/315 X |
| 3,487,823 | 1/1970 | Tarter et al......................251/367 X |
| 3,497,178 | 2/1970 | Priese..............................251/315 X |
| 3,617,025 | 11/1971 | Gerbic.............................251/315 X |
| 3,620,243 | 11/1971 | Zatopek...........................251/315 X |

Primary Examiner—Samuel Scott
Attorney—Melvin R. Stidham

[57] ABSTRACT

A ball valve seal comprising a seal ring of yieldable material and of rectangular cross-section, though with one inner corner removed leaving a conical sealing surface. A seat ring assembly almost completely contains the seal ring, engaging both readial and both cylindrical surfaces to inhibit cold flow of the seal material, with just the conical surface exposed. A groove around the outer cylindrical surface of the seal ring provides space for thermal expansion relative to the seat ring. A back seal ring, which seals around the seat ring, has an internal conical surface that engages a complementary surface on the seat ring assembly whereby hoop tension provides a spring force under axial load.

10 Claims, 3 Drawing Figures

INVENTORS
FRANCIS E. MURPHY
WILLIAM L. KANE

ATTORNEY

Patented March 27, 1973

INVENTORS
FRANCIS E. MURPHY
WILLIAM L. KANE
BY Melvin R. Stidham
ATTORNEY

BALL VALVE SEAL FOR HIGH TEMPERATURE OPERATION

BACKGROUND OF THE INVENTION

This application relates to a ball valve seal for high temperature operation, and, more particularly, to a ball valve with a seal ring of yieldable material which is resistent to high temperatures and/or high pressures.

Valves designed for installation in lines conducting fluids at high temperature, e.g., steam, frequently employ metal to metal seals, though in many instances for bubble tight sealing, it is highly desirable to use seals of resilient materials. However, many resilient materials, such as elastomers, are incapable of withstanding high temperatures in the order of 200° to 500° Fahrenheit. Certain plastic materials are capable of withstanding high temperatures, but those that are susceptible to cold flow under pressure, may become distorted under pressure and rendered totally ineffective for sealing purposes.

OBJECTS OF THE INVENTION

It is an object of this invention to provide a seal ring assembly including a plastic seal ring which is almost entirely contained within a rigid seat ring assembly.

It is a further object of this invention to provide a rigidly contained plastic seal ring with a groove around its periphery to provide space for relative thermal expansion.

It is a further object of this invention to provide a seal ring of resilient material with a groove formed in the outer periphery to increase resilience under axial forces.

It is a further object of this invention to provide complementary conical surfaces on a seat ring assembly and a back seal so that the yieldable hoop tension provides an axial spring force.

It is a further object of this invention to provide a seat ring assembly with a back seal that functions also as a yieldable biasing member.

Other objects and advantages of this invention will become apparent from the description to follow when read in conjunction with the accompanying drawings.

BRIEF SUMMARY OF THE INVENTION

In carrying out this invention, a ball valve is provided with seat ring assemblies, each assembly being made up of two-piece rigid holder rings, which together form a recess for a seal ring of yieldable plastic material. The inner holder ring forms the radial recess bottom surface and the cylindrical inner recess wall. The leading edge of the inner recess wall is machined as a conical or spherical surface to form a secondary "fire-safe" metal seat. The outer holder ring comprises the cylindrical outer wall, with an inward radial extension forming a front retainer. The resilient seal member is basically of rectangular cross-section with an inner corner removed, forming an inner conical sealing surface for engagement with the ball. Both of the cylindrical surfaces and both of the planar radial surfaces are engaged by the rigid holder ring assembly so that the seal member is almost entirely contained to inhibit distortion under cold flow. A groove is formed around the outer periphery of the seal member to leave a space within the recess for thermal expansion. The seat ring holder assembly is secured together in a unitary structure by snapping a V-shaped radial extension on the inner holder ring onto a V-groove on the outer holder ring.

The back surface of the seat ring assembly is generally conical merging into a trailing cylindrical surface on which a back seal ring is carried. Under axial load, a complementary conical surface on the back seal is forced up the seat ring conical surface and is thereby placed under hoop tension. This provides a spring force biasing the seat ring against the ball. The axial load also forces the outer cylindrical surface of the back seal ring into firm sealing engagement with the cylindrical surrounding holder ring recess forming a positive seal.

DESCRIPTION OF THE PREFERRED EMBODIMENT

Figure 1:
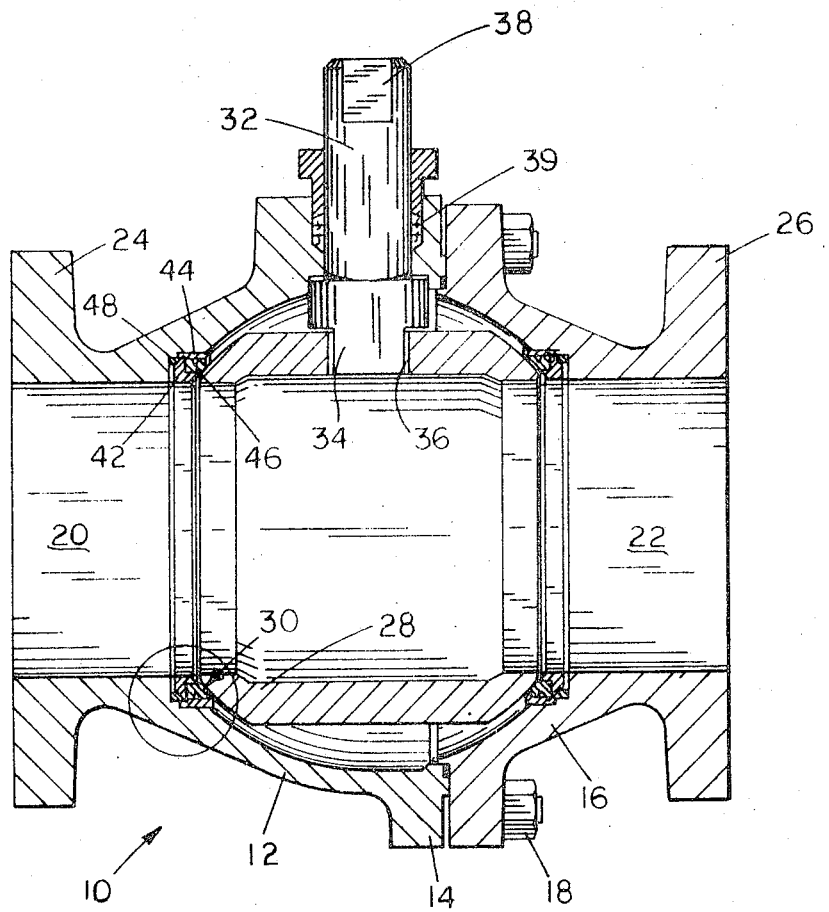
FIG. 1 is a vertical section view of a ball valve embodying features of this invention.

Referring now more particularly to FIG. 1, the ball valve 10 of the invention includes a valve body section 12 having an integral flange 14 to which is secured a body closure 16 by any suitable means such as the bolts 18. Inlet and outlet flow passages 20 and 22 are formed in the body 12 and the body closure 16, and both sections are provided with flanges 24 and 26 or other suitable means for connection into a pipeline (not shown).

The ball valve 10 has a floating ball 28 rotatably supported on seat rings 30 to be described in greater detail. The ball may be rotated through 90° between open and closed positions by means of a valve stem 32, which is rotatably carried in the valve body. A driving tang 34 at the lower end of the stem, extends into a complementary slot 36 at the top of the ball 28 to impart rotation to the ball. The stem may be rotated by any suitable means such as a wrench (not shown) gripping the flats 38 at the upper end of the stem. Suitable packing 39 is provided to prevent leakage around the stem.

Figure 2:
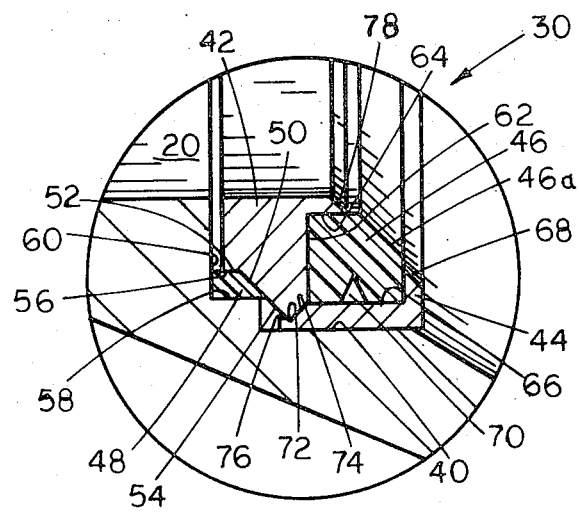
FIG. 2 is an enlarged partial section view of one of the seat ring assemblies of FIG. 1.
Figure 3:
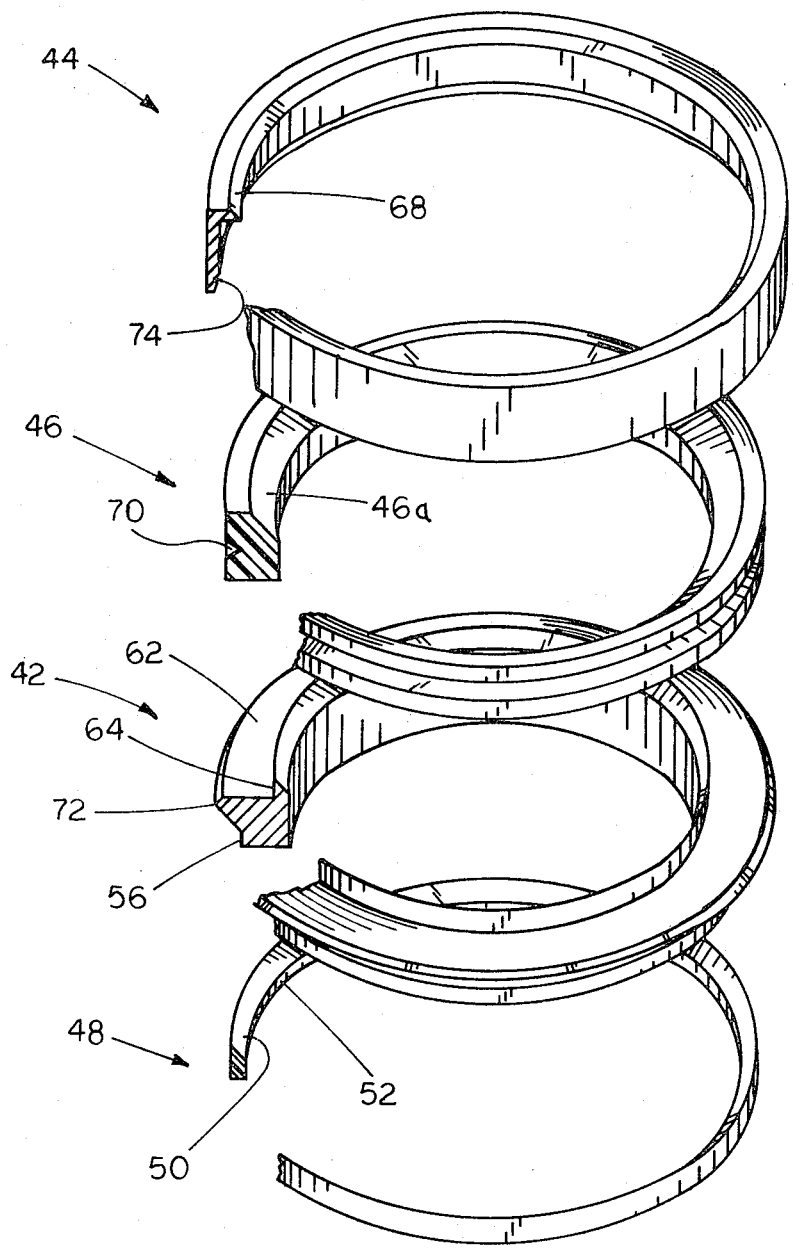
FIG. 3 is an exploded isometric view of the seat ring assembly.

The seat ring assembly 30 (FIG. 2) is mounted in a recess 40 formed in the valve body and comprises an inner holder ring 42 and an outer holder ring 44, together containing a seal member 46 of yieldable material. The seal member may be formed of a suitable plastic such as a glass reinforced polytetrafluoroethylene sold under the trademark Teflon. A back seal ring 48 of suitable material, such as Teflon, having a conical inner surface 50 merging into a cylindrical surface 52 is carried on complementary conical and cylindrical surfaces 54 and 56 on the inner holder ring. The back seal ring 48 slides in a counterbore portion 58 of the recess 40, whereby the seat ring assembly is free to slide under fluid pressure asserted directly or through the ball. The back seal ring 48 seals between the conical surface 54 of the inner holder ring and both the back wall 60 and the cylindrical wall 58 of the counter-bore. In addition, because of the complementary conical surfaces 50 and 54, axial forces against the seat ring assembly and back seal place the back seal ring 48 under hoop tension to supplement the resilience inherent in the material and produce greater spring force.

The rigid inner holder ring 42 has a radial leading planar surface 62 that forms the bottom of the recess for the plastic seal ring 46, and an annular extension with a cylindrical outer surface 64 that forms a side wall of the recess. The leading edge of this annular extension is machined at an angle parallel in cross-section to a tangent of the ball 28, to provide a secondary fire-safe seat 78 in the event the main seal ring 46 is destroyed. The outer seat ring 44 has a cylindrical inner surface 66 forming another side wall of the recess and a radial inward extension 68 forming a partial outer recess wall.

As shown, the yieldable plastic seal member 46 is of generally rectangular cross-section with the inner corner removed forming a generally conical sealing surface 46a for engagement with the ball 28. Hence, both of the radial planar surfaces and both of the cylindrical surfaces of the seal member are embraced by the rigid seat ring assembly. Because the plastic seal ring is almost completely contained, cold flow of the plastic material is greatly inhibited. At the same time, thermal expansion of the seal member relative to the rigid seat ring assembly is enabled by virtue of a V-groove 70 which is cut around the periphery of the seal member. The cross sectional area of the seal member relative to that of the groove is calculated to insure that the volume of the groove is sufficient to permit and accommodate thermal expansion of the seal member relative to the seat ring assembly, taking into consideration the coefficient of thermal expansion of the resilient material, the maximum operating temperature for which the valve is designed and the maximum seal ring volume to be tolerated. The final dimensions and the orientation of the groove 70 are determined by consideration of the structural strength and increased resilience under axial forces.

The inner seat ring is provided with a V-shaped radial extension 72 which snaps into a complementary V-groove 74 which is formed in the inner surface of the outer seat ring 44. A trailing portion of the outer seat ring inner surface is cut away to form a slightly conical camming surface 76 which is forced outward by the conical surface 72 of the inner seat ring, allowing them to snap together in firm interlocking engagement.

Under pressure, the ball 28 will tend to move downstream to push the downstream seat ring assembly 30 against the back seal 48, providing a firm downstream seal. At the same time, the upstream seat ring is biased in the downstream direction under the force of the back seal, tending to maintain an upstream seal with the ball. Line pressure behind the seat ring assembly 30 forces the back seal 48 into firm sealing engagement between the stepped recess 58 and the seat ring assembly so that it functions both as a seal and as a spring.

While this invention has been described in conjunction with a preferred embodiment thereof, it is obvious that modifications and changes therein may be made by those skilled in the art without departing from the spirit and scope of this invention.

What is claimed is:

1. A ball valve seat ring assembly comprising:
    an inner holder ring,
    a generally radial leading surface and an annular extension on said inner seat ring,
    an outer holder ring secured around said inner holder ring, and
    an internal cylindrical surface on said outer holder ring intersecting at the trailing end thereof with said leading surface,
    an inward radial extension at the forward end of said outer holder ring, and
    a seal member of a yieldable material, carried on said holder rings, generally radial trailing and forward surfaces and inner and outer cylindrical surfaces on said seal member engagable by said leading surface, said inward extension, said annular extension and said internal cylindrical surface, respectively,
    said inner and outer holder rings being secured together by interlocking engagement of
    a V-shaped radial extension around said inner holder ring, and
    a V-groove around said internal cylindrical surface.

2. The seat ring assembly defined by claim 1 including:
    a generally conical surface on said seal member intersecting said inner cylindrical and forward radial surfaces to engage a valve ball closure member.

3. The seat ring assembly defined by claim 1 wherein: the trailing portion of the outer holder ring is reduced in thickness and tapered outward rearward from said V-groove so that said trailing portion may be cammed outward by said radial extension to snap said extension into and out of said V-groove.

4. The seat ring assembly defined by claim 1 wherein: the leading edge of the annular extension on said inner seat ring is formed on a taper.

5. The seat ring assembly defined by claim 1 including:
    an external conical surface on said inner holder ring tapering inward rearward of said leading surface,
    a back seal ring of yieldable material carried on said inner holder ring, and
    complementary conical and cylindrical surfaces on said seal ring slidable on said external conical and cylindrical surfaces of said inner holder ring.

6. The seat ring assembly defined by claim 5 including:
    said back seal ring extends rearward of said inner holder ring and is adapted for sealing engagement with the bottom wall of a valve body recess.

7. A valve structure comprising:
    a valve body with flow passages therethrough,
    a closure member mounted in said body and having a flow blocking surface thereon movable into and out of alignment with one of said flow passages,
    a recess in said valve body around said one flow passage, and
    a seat ring assembly slidably received in said recess,
    an external conical surface on said seat ring assembly tapering inward toward the back thereof,
    a trailing external cylindrical surface extending rearward from said external conical surface,
    a back seal ring of yieldable material, and
    complementary conical and cylindrical surfaces on said back seal ring slidable on said external conical and cylindrical surfaces on said seat ring assembly.

8. The valve structure defined in claim 7 including:

a generally radial bottom wall in said valve body recess, said back seal ring being in sealing engagement with said recess bottom wall.

9. The valve structure defined by claim 8 including:

a cylindrical wall in said valve body recess, and a complementary outer cylindrical surface on said back seal ring in sliding engagement with said cylindrical wall.

10. A ball valve seat ring assembly for high temperature operation comprising:

an inner holder ring, a generally radial leading surface and an annular extension on said inner seat ring, an outer holder ring secured around said inner holder ring, and an internal cylindrical surface on said outer holder ring intersecting at the trailing end thereof with said leading surface, an inward radial extension at the forward end of said outer holder ring, and a seal ring of a yieldable material, having a greater coefficient of thermal expansion than that of the inner and outer holder rings carried on said holder rings, generally radial trailing and forward surfaces and inner and outer cylindrical surfaces on said seal ring engagable by said leading surface, said inward extension, said annular extension and said internal cylindrical surface, respectively, to be substantially confined thereby, a groove around said seal ring of an area in cross-section sufficient to accommodate greater thermal expansion of said seal member relative to said inner and outer holder rings.

* * * * *